US007869173B2

(12) United States Patent
Kempler

(10) Patent No.: US 7,869,173 B2
(45) Date of Patent: Jan. 11, 2011

(54) BI-DIRECTIONAL GFCI

(75) Inventor: Fred Kempler, Little Neck, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 185 days.

(21) Appl. No.: 12/132,598

(22) Filed: Jun. 3, 2008

(65) Prior Publication Data

US 2009/0296288 A1 Dec. 3, 2009

(51) Int. Cl.
*H02H 3/16* (2006.01)

(52) U.S. Cl. .......................................... 361/42; 361/44

(58) Field of Classification Search ............. 361/42–50
See application file for complete search history.

(56) References Cited

U.S. PATENT DOCUMENTS

| | | | | |
|---|---|---|---|---|
| 3,668,471 | A | 6/1972 | Ambler et al. | |
| 4,568,997 | A | 2/1986 | Bienwald et al. | |
| 5,418,678 | A | 5/1995 | McDonald | |
| 5,541,800 | A | 7/1996 | Misencik | |
| 5,661,623 | A | 8/1997 | McDonald et al. | |
| 5,706,155 | A | 1/1998 | Neiger et al. | |
| 5,729,417 | A | 3/1998 | Neiger et al. | |
| 6,052,265 | A | 4/2000 | Zaretsky et al. | |
| 6,246,558 | B1 | 6/2001 | DiSalvo et al. | |
| 6,417,581 | B2 | 7/2002 | Hall et al. | |
| 6,437,700 | B1 | 8/2002 | Herzfeld et al. | |
| 6,522,510 | B1 | 2/2003 | Finlay et al. | |
| 6,621,388 | B1 | 9/2003 | Macbeth | |
| 6,657,839 | B2 | 12/2003 | de Oliveira | |
| 6,693,779 | B2 | 2/2004 | DiSalvo | |
| 6,724,590 | B1 | 4/2004 | Radosavljevic et al. | |
| 6,771,152 | B2 | 8/2004 | Germain et al. | |
| 6,807,035 | B1 | 10/2004 | Baldwin et al. | |
| 6,807,036 | B2 | 10/2004 | Baldwin | |
| 6,920,025 | B2 | 7/2005 | Nelson | |
| 6,937,452 | B2 | 8/2005 | Chan et al. | |
| 7,187,526 | B2 | 3/2007 | DiSalvo | |
| 7,196,886 | B2 | 3/2007 | Chan et al. | |
| 7,298,598 | B1 * | 11/2007 | Morgan et al. | 361/45 |
| 7,558,034 | B2 * | 7/2009 | Bonasia et al. | 361/42 |
| 2005/0117264 | A1 * | 6/2005 | Aromin | 361/42 |
| 2006/0268472 | A1 | 11/2006 | Winch | |
| 2007/0268635 | A1 | 11/2007 | Bonasia et al. | |
| 2007/0274012 | A1 | 11/2007 | Bonasia et al. | |
| 2009/0086389 | A1 | 4/2009 | Huang et al. | |
| 2009/0086390 | A1 | 4/2009 | Huang | |
| 2009/0161271 | A1 | 6/2009 | Huang et al. | |

FOREIGN PATENT DOCUMENTS

| | | |
|---|---|---|
| WO | WO 2004 070901 | 8/2004 |
| WO | WO 2007 137180 | 11/2007 |

* cited by examiner

*Primary Examiner*—Danny Nguyen
(74) *Attorney, Agent, or Firm*—Collard & Roe, P.C.

(57) ABSTRACT

A bi-directional fault circuit interrupter comprising a first connection interface, a second connection interface, at least one fault circuit, and at least one switch which is movable from at least one first position to at least one second position to selectively electrically connect the fault circuit to either the first connection interface or the second connection interface. There are also a plurality of conductors configured to electrically connect the first connection interface to the switch and the second connection interface to the switch.

20 Claims, 11 Drawing Sheets

BI-DIRECTIONAL GFCI

BACKGROUND

The invention relates to a bi-directional circuit interrupter that can be set to connect to either a first pole or set of contacts or switched to a second pole or set of contacts depending on how the device is initially wired.

Other patents that generally relate to fault circuits include U.S. Pat. No. 4,595,894 to Doyle et al. and which issued on Jun. 17, 1986; U.S. Pat. No. 5,706,155 to Neiger et al. which issued on Jan. 6, 1998; U.S. Pat. No. 5,715,125 to Neiger et al. which issued on Feb. 3, 1998; U.S. Pat. No. 6,426,558 to DiSalvo et al. which issued on Jun. 12, 2001; U.S. Pat. No. 6,937,452 to Chan et al. which issued on Aug. 30, 2005; U.S. Pat. No. 7,049,910 to Campolo et al. which issued on May 23, 2006; U.S. Pat. No. 7,196,886 to Chan et al. which issued on Mar. 27, 2007, wherein the disclosures of these patents are hereby incorporated herein by reference in their entirety.

SUMMARY

The invention relates to a bi-directional fault circuit interrupter comprising a first connection interface, a second connection interface, at least one fault circuit, and at least one switch which is movable from at least one first position to at least one second position to selectively electrically connect the fault circuit to either the first connection interface or the second connection interface. There are also a plurality of conductors configured to electrically connect the first connection interface to the switch and the second connection interface to the switch.

One way to effect this switching is to have a fusable link coupled between the phase and neutral lines of the first interface and a fusable link coupled between the phase and neutral lines of the second interface. The device can also include a spring, and an anchor which can be used to bias the switch in a first position. When at least one of the fusable links is burned out, the device can then either remain in the first position, or switch to the second position. The spring and the anchor can be coupled in any manner known, however in at least one embodiment the spring is coupled between the fusable link on the first interface, and the switch, while the anchor is coupled between the fusable link on the second interface and the switch.

There is also a method for selectively switching a bi-directional fault circuit interrupter. The method comprises the steps of biasing at least one switch in at least a first position, coupling a power line to at least one of a first interface or a second interface; burning out at least one fusable link coupled to at least one of the first interface and the second interface to release the switch, wherein the switch is adapted such that it can selectively move to couple power from the power line to a fault circuit interrupter.

In at least one embodiment, the switch described above is a mechanical switch which relies on the burning out or failure of a fusable link. The above described mechanical switching system provides a relatively simple mechanical switch which insures that fault circuit protection is applied regardless of how the device is wired.

Alternatives to the fusable links can be in the form of electro mechanical switches, thermo mechanical switches, or any other thermo or electronic device which would selectively release the anchor and the spring to selectively hold or throw the switches.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION

Figure 1:
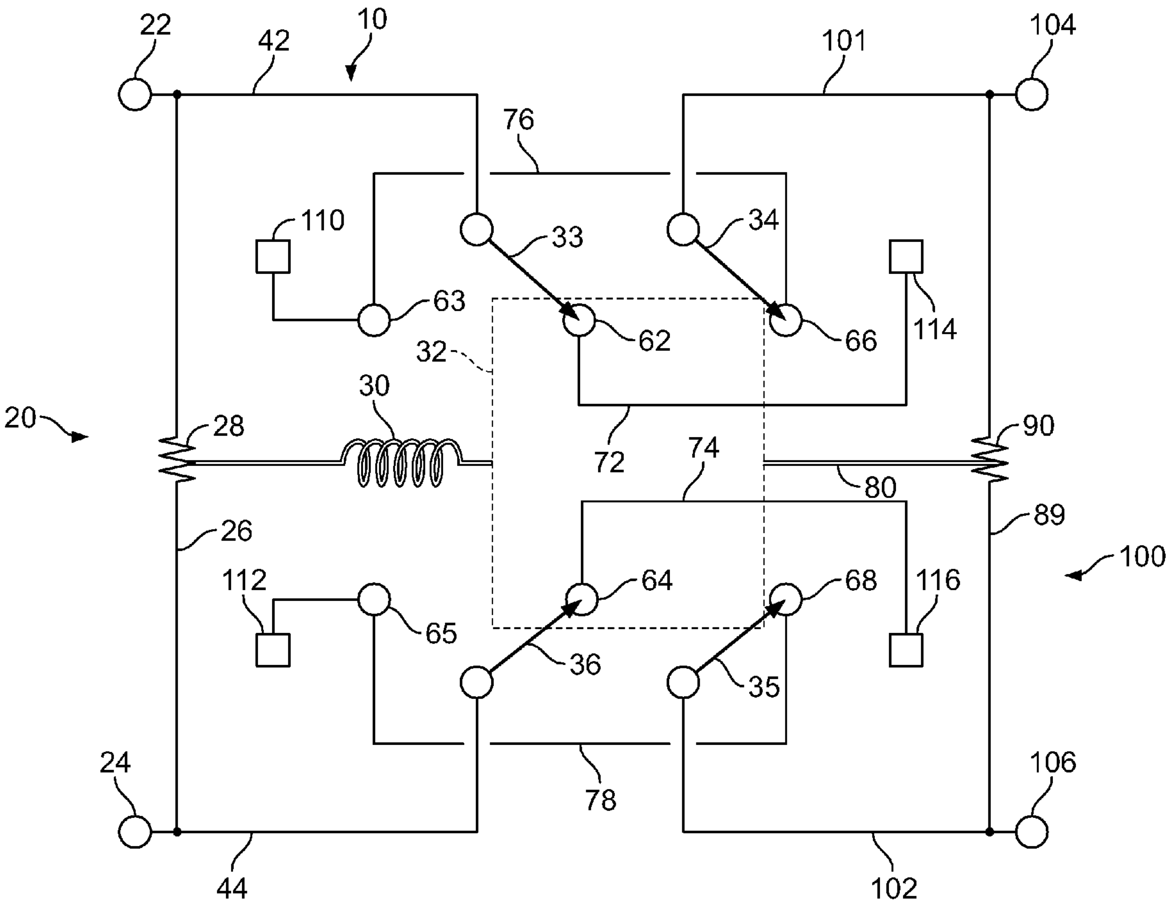
FIG. 1 is a schematic block diagram of a first position for the first embodiment.

FIG. 1 is a schematic block diagram of a first position for the first embodiment 10 which is a bi-directional switching system for a fault circuit interrupter. In this case, there is a first interface 20 comprising first phase input 22, a first neutral input 24 and a line 26 comprising a fusable link 28 coupled between first phase input 22 and first neutral input 24. Coupled to fusable link 28, is a spring 30, wherein spring 30 is coupled at a first end to fusable link 28 and at a second end to a switch body 32. Switch body 32 is for selectively switching at least one switch such as switches 33, 34, 35, and 36, from either a first position shown in FIG. 1 to a second position shown in FIG. 8.

First phase input 22 is coupled to first phase line 42, while first neutral input 24 is coupled to first neutral line 44. There is also a second phase line 101 coupled to second phase input 104 while second neutral line 102 is coupled to second neutral input 106.

There are also contacts or poles 62, 64, 66, and 68 which are formed as the GFCI line and load contacts such as GFCI line phase contact 62, GFCI line neutral contact 64, GFCI load phase contact 66 and GFCI load neutral contact 68. There are also corresponding contacts or poles 63, and 65.

For example, the GFCI line phase pole. Poles 63 and 66 are the GFCI load phase poles. Pole 64 is the GFCI line neutral pole, while poles 65 and 68 are the GFCI load neutral poles.

There are also lines 72, 74, 76 and 78 which provide selective electrical contact to GFCI components. For example, line 72 is coupled at a first end to switching pole 62 and at a second end to GFCI line phase contact 114 of a GFCI circuit such as GFCI 50 (See FIG. 9). Line 74 is coupled at a first end to contact 64 and at a second end to GFCI line neutral contact 116 of a GFCI circuit such as GFCI 50. Line 76 is coupled at a first end to contact 66 and at a second end to GFCI load phase contact 110 of GFCI 50, wherein this line is also coupled to contact 63 as well. Line 78 has a first end coupled to contact 68 and a second end coupled to GFCI load neutral contact 112 of GFCI 50, wherein this line is also coupled to contact 65 as well.

Figure 6:
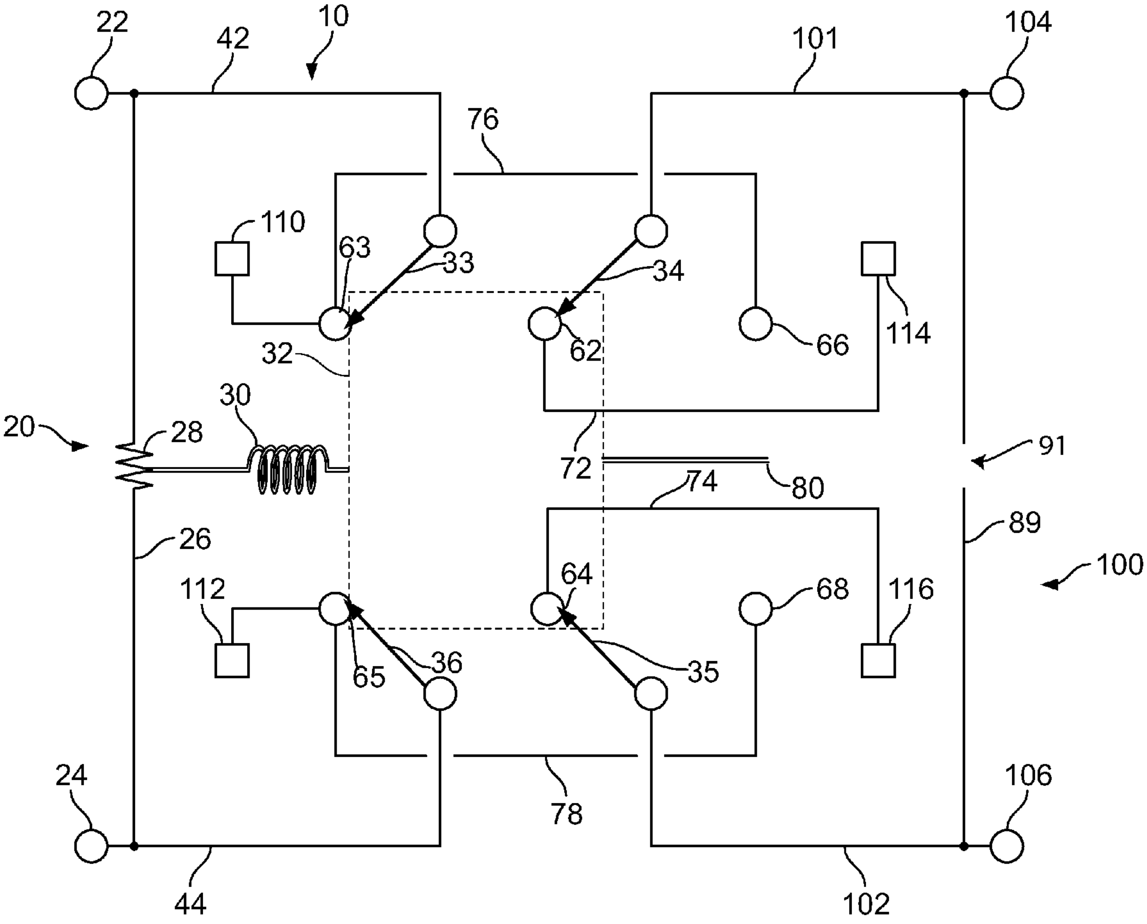
FIG. 6 is a schematic block diagram of the design shown in FIG. 1 with the fusable link coupled to the second interface being burned out, and the switch being thrown to a second position.
Figure 7:
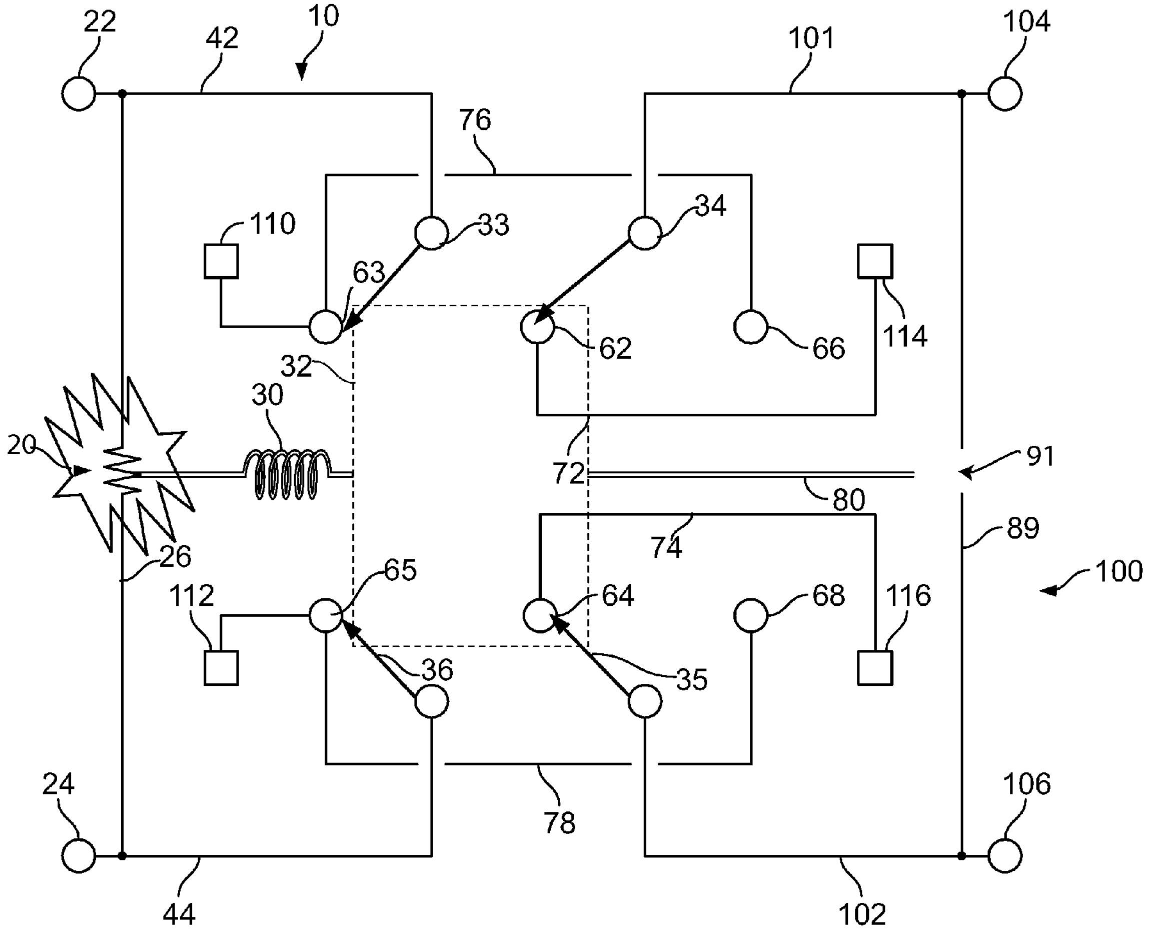
FIG. 7 is a schematic block diagram of power flowing across the second interface.
Figure 8:
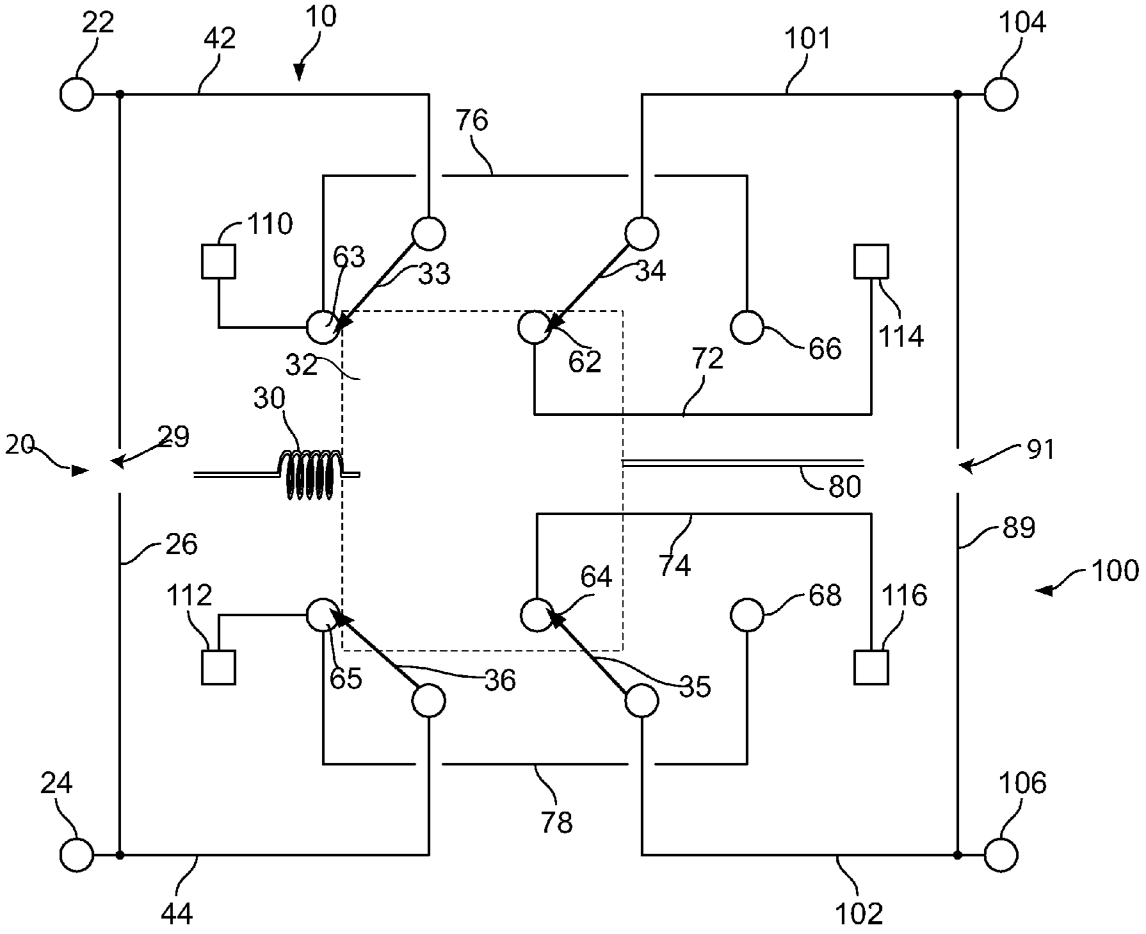
FIG. 8 is a schematic block diagram of the fusable link being burned across the first interface releasing the spring and setting the switch.

Thus, switch 33 selectively switches from a first position connected to pole 62 to a second position connected to pole 63, while switch 34 selectively switches from a first position connected to pole 66 to a second position connected to pole 62 depending on how the device is wired. In addition, switch 35 switches from a first position connected to pole 68 to a second position connected to pole 64, while switch 36 switches from a first position connected to pole 64 to a second position connected to pole 65. When the device is wired with the power line coupled to first interface 20, then the switches are in the first position as shown in FIGS. 1-4. When the device is wired to the second interface, the switches are thrown over to the second position as shown in FIGS. 6-8. Thus, as a result of the poles and the switches, regardless of whether the device is wired with the power line connected to the first interface 20 or to the second interface 100, the GFCI 50 (See FIGS. 9 and 10) always provides fault circuit protection to the face contacts as well as to the downstream load contacts.

One way to create this switching, is to provide fusable links positioned so as to selectively allow an actuator to move a switch body such as switch body 32, depending on whether a power line is coupled to a first interface 20 or to a second interface 100. In this case, the actuator is in the form of spring 30 and anchor 80. An example of the process stages for controlling the movement of the switch body 32 when the power line is coupled to the first interface 20 is shown in FIGS. 1-4. An example of the process stages for controlling the movement of switch body 32 when the power line is coupled to the second interface 100 is shown in FIGS. 5-8.

For example, FIG. 1 shows the device with the switches biased in the first position, and before the device 10 is coupled to a power line. In this position, switch body 32 is held biased in a first position by anchor 80 being coupled to a fusable link 90, while this switch body is coupled to a spring 30 which is under tension.

Figure 2:
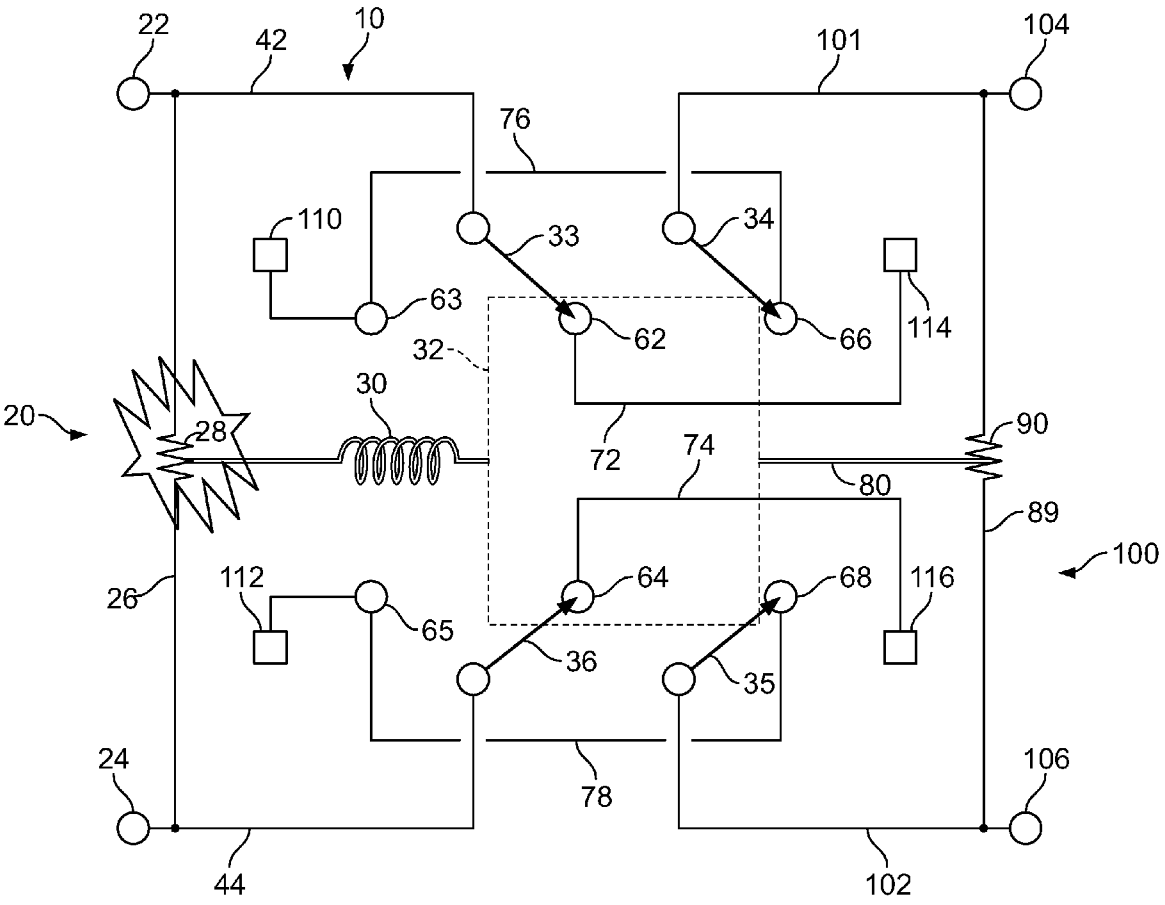
FIG. 2 is a schematic block diagram of the design shown in FIG. 1 with the power line being coupled to the first interface.

FIG. 2 shows an example of when device 10 has interface 20 coupled to a power line with a power phase line coupling to first phase contact 22 and a power neutral line coupling to first neutral contact 24. Power flows from first phase line 42 to first neutral line 44 across bridge line 26. When this power flows across bridge line 26, it causes fusable link 28 to burn out as shown in FIG. 2.

Figure 3:
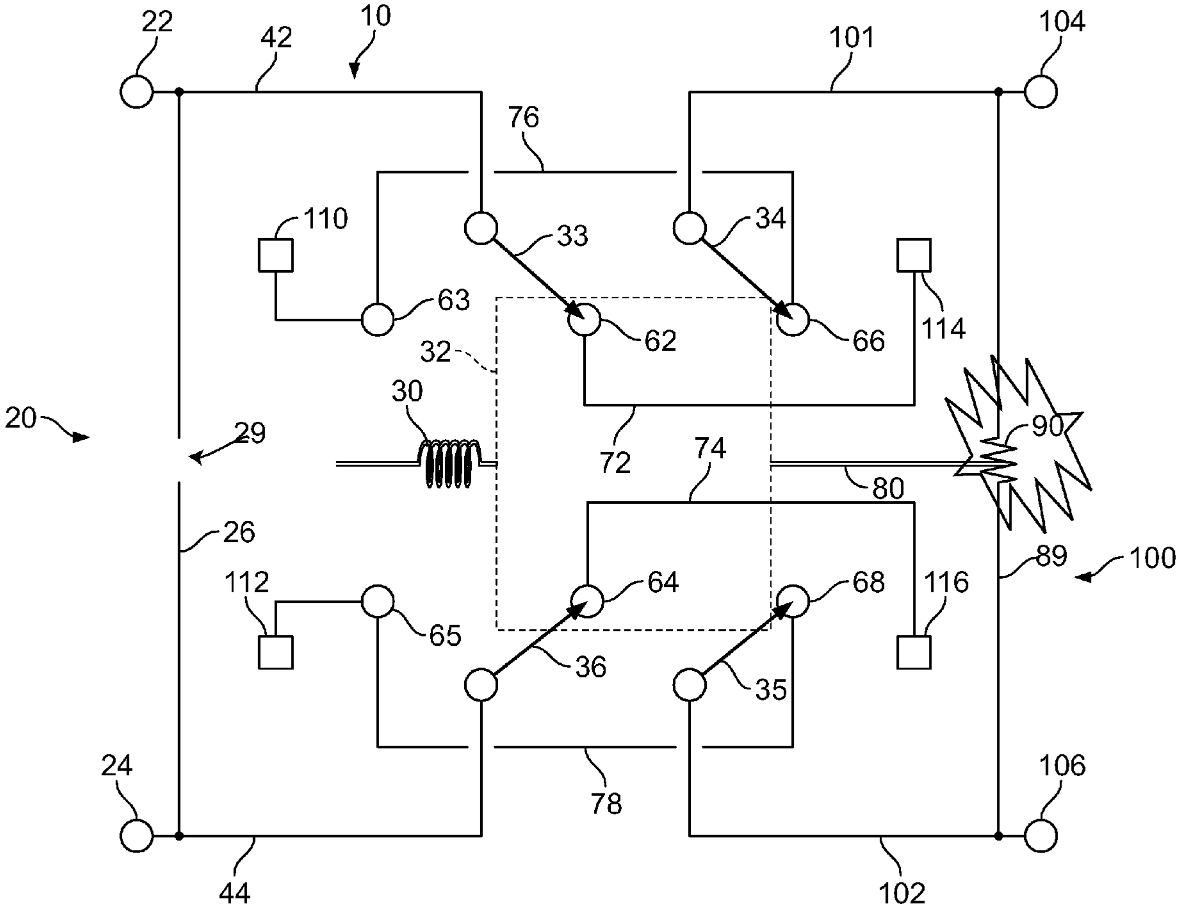
FIG. 3 is a schematic block diagram of the design shown originally in FIG. 1 with the fusable link coupled to the first interface being burned out.

Once fusable link 28 is burned out, as shown in FIG. 3, spring 30 is now released from tension allowing switch body 32 to remain in place in the first position. In addition, as shown in FIG. 3, when bridge contacts are set, such as when a user presses a reset button (see reset button 170 in FIG. 9), power flows from the first side to the second side so that power flows through bridge line 89 from second phase line 101 to second neutral line 102 thereby burning out fusable link 90. This power flowing through second phase line 101 and second neutral line 102 only occurs when bridged contacts are closed (See FIGS. 9 and 10), thereby allowing power to flow across phase contact 42 to second phase contact 101, and from first neutral contact 44 to second neutral contact 102.

Figure 4:
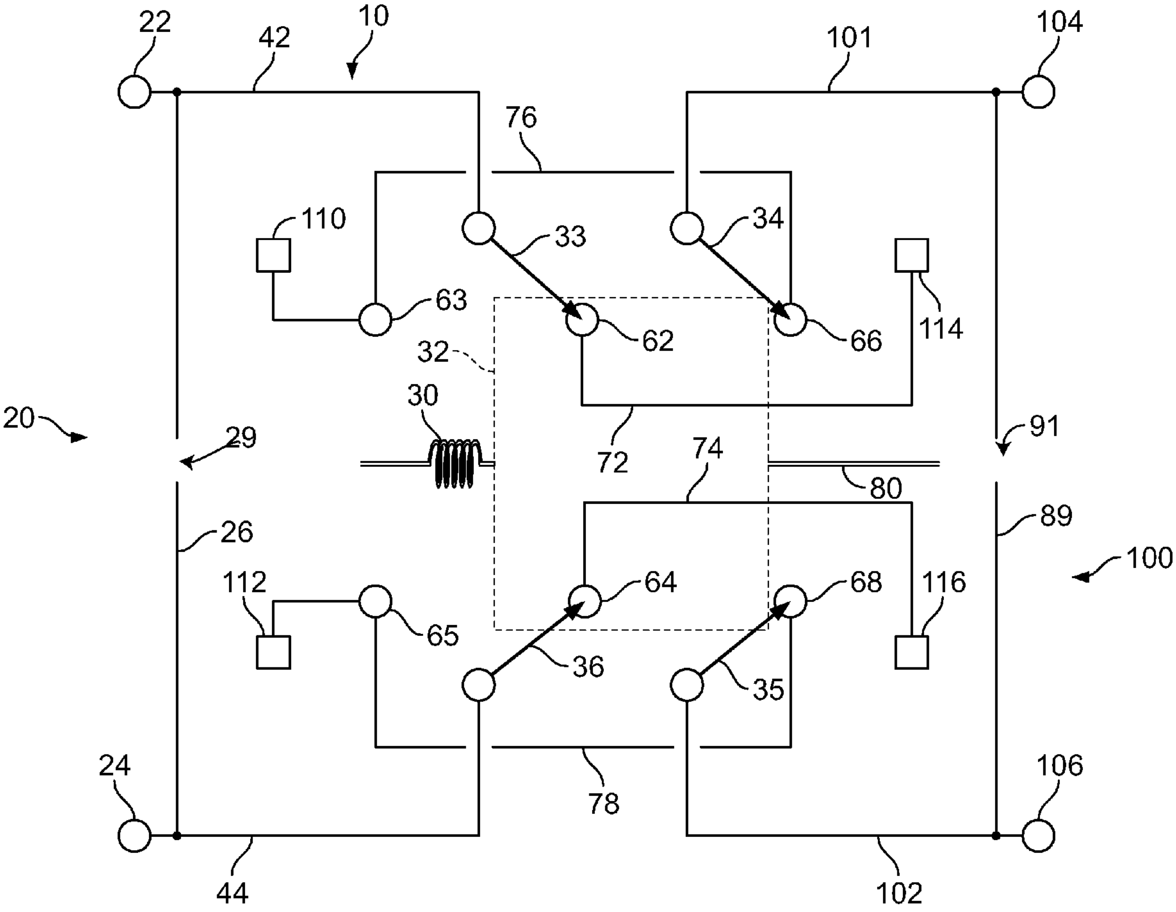
FIG. 4 is a schematic block diagram of the design shown in FIG. 1 with the fusable link coupled to the second interface being burned out.

FIG. 4 shows the end result with a gap 29 in place of former fusable link 28, and gap 91 in place of former fusable link 90. This process results in switch body 32 being disposed in its first position, and remaining in its first position for the life of the device.

Figure 5:
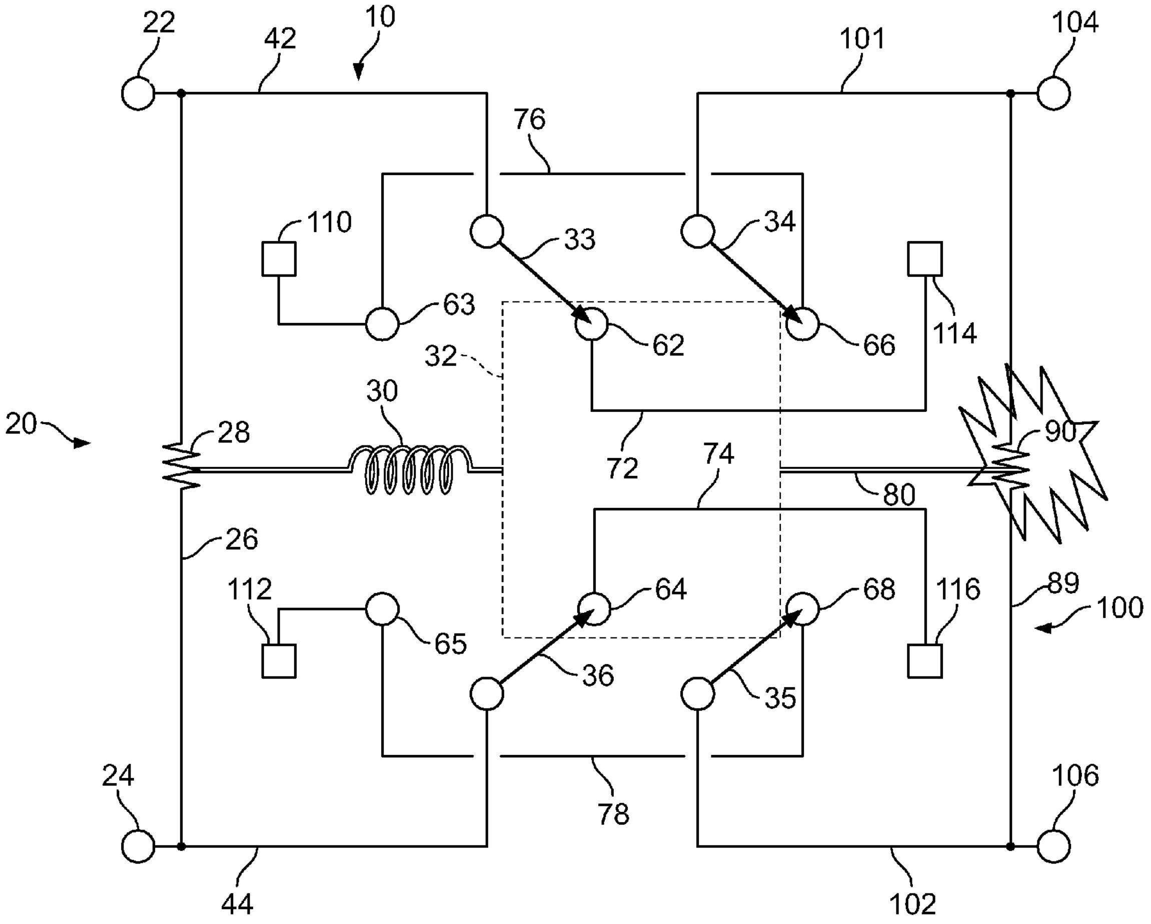
FIG. 5 is a schematic block diagram of the design shown in FIG. 1 with a power line being coupled to the second interface.

If the device is wired such that a power line is coupled to a second interface such as interface 100, then the power line has a phase line that is coupled to second phase contact 104, while the power line has a neutral line coupled to second neutral contact 106 as shown in FIG. 5. In this configuration, power flows across bridge line 89 burning out fusable link 90, thereby releasing anchor 80 before fusable link 28 is burned out. In this configuration, before fusable link 90 is burned out, switch body 32 and thus the switches 33, 34, 35 and 36 remain in the first position.

FIG. 6 shows that after the device is wired, fusable link 90 is now burned out such that the switch can now be thrown to the second position. This occurs because spring 30 which was previously under tension, now throws switch body 32 over to the second position thereby pulling switches 33, 34, 35 and 36 over to the second position when anchor 80 is released from fusable link 90.

FIG. 7 shows the next step in this process wherein fusable link 28 is next burned out when power is applied across first phase line and first neutral line through bridge line 26. In this case, the application of power to first phase line 42 and first neutral line 44 only occurs when bridged contacts are closed via a reset button, thereby allowing power to flow from second phase line and second neutral line across these bridged contacts.

FIG. 8 shows that once power is applied across bridge 26, fusable link 28 burns out, leaving gap 29 and gap 91, resulting in switch body 32 being left in the second switch position, with switches 33, 34, 35, and 36 being positioned in this second switch position.

Figure 9:
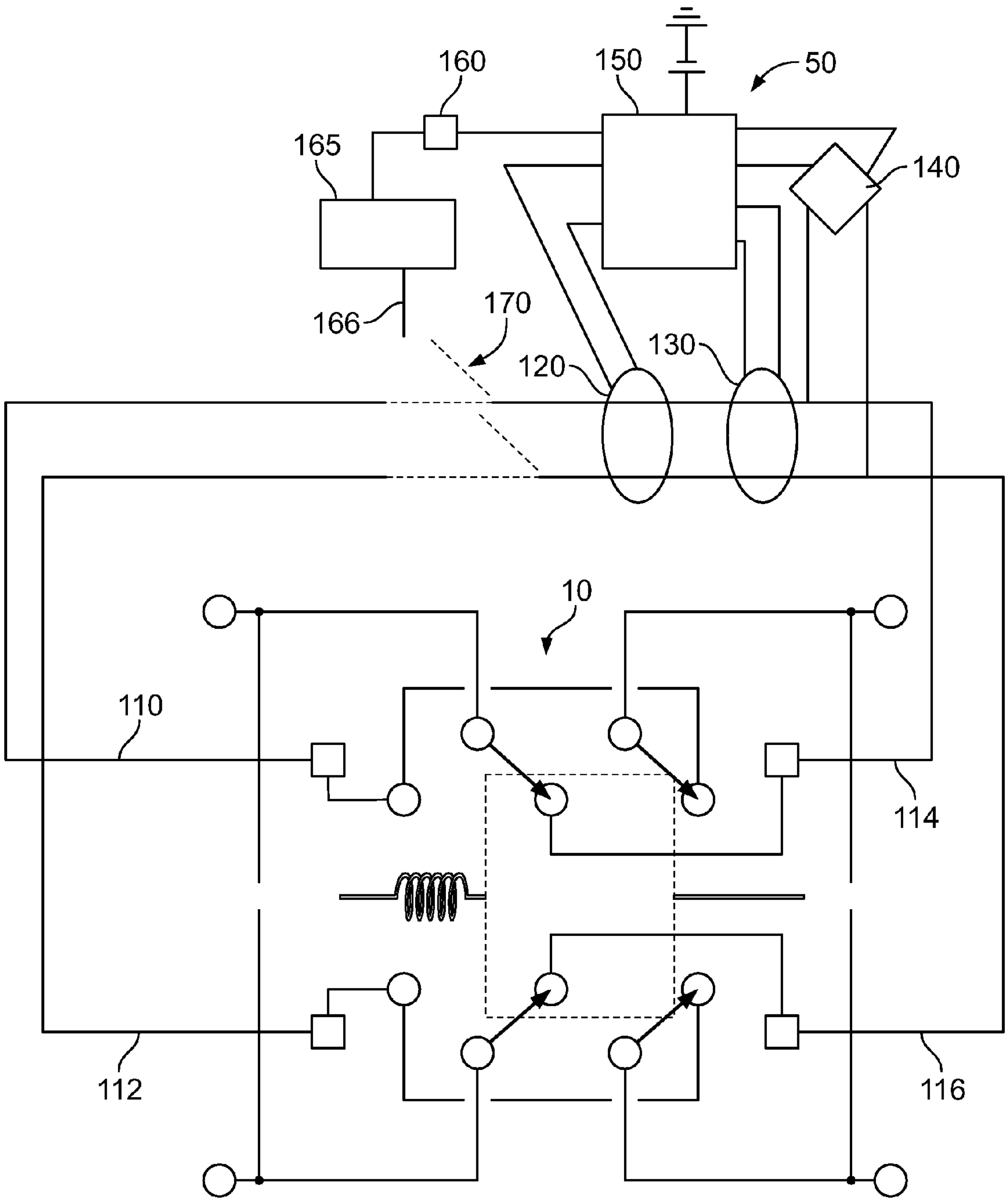
FIG. 9 is a schematic block diagram of the embodiment shown in FIG. 4 being applied to a fault circuit interrupter.

FIG. 9 is a schematic block diagram of the embodiment shown in FIG. 1. being applied to a fault circuit 50. The fault circuit includes a differential transformer 130, a grounded neutral transformer 120, a bridged rectifier 140, and an integrated circuit 150. Integrated circuit 150 is in communication with the windings of differential transformer 130 and grounded/neutral transformer 120 to determine whether there is a ground fault. In addition, an output of integrated circuit 150 is coupled to the input of a switch 160 which can be in the form of any known switch but in this case is a silicon controlled rectifier (SCR). In addition, switch 160 is coupled to actuator 165 which has a pin or plunger 166 for selectively activating contacts 170. Contacts 170 are configured to couple line 114 to line 110, and line 116 to line 112, when these contacts are set.

These contacts 170 can be set in a known way such as through the pressing of a reset contact switch which sets these contacts in place thereby allowing power to flow between line 114 and line 110 and power to flow between line 116 and line 112.

Figure 10:
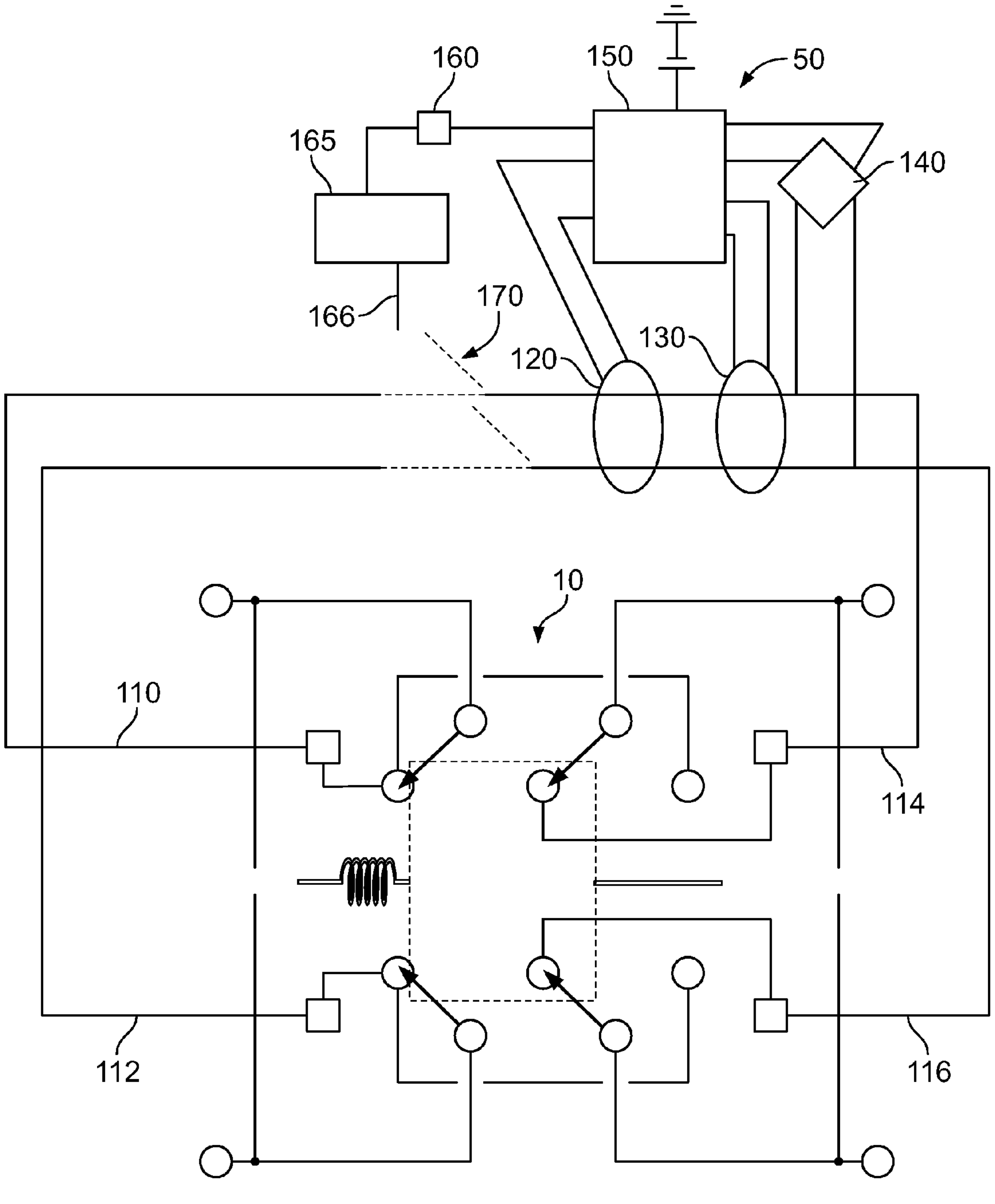
FIG. 10 is a schematic block diagram of the embodiment shown in FIG. 8 being applied to a fault circuit interrupter.

FIG. 10 is similar to FIG. 9 however, this view shows GFCI 50 which is coupled to the device 10, wherein in this view, the switch body and associated switches are thrown to the second position and both of the fusable links are burned out thereby leaving the switch body thrown to the second position.

Figure 11:
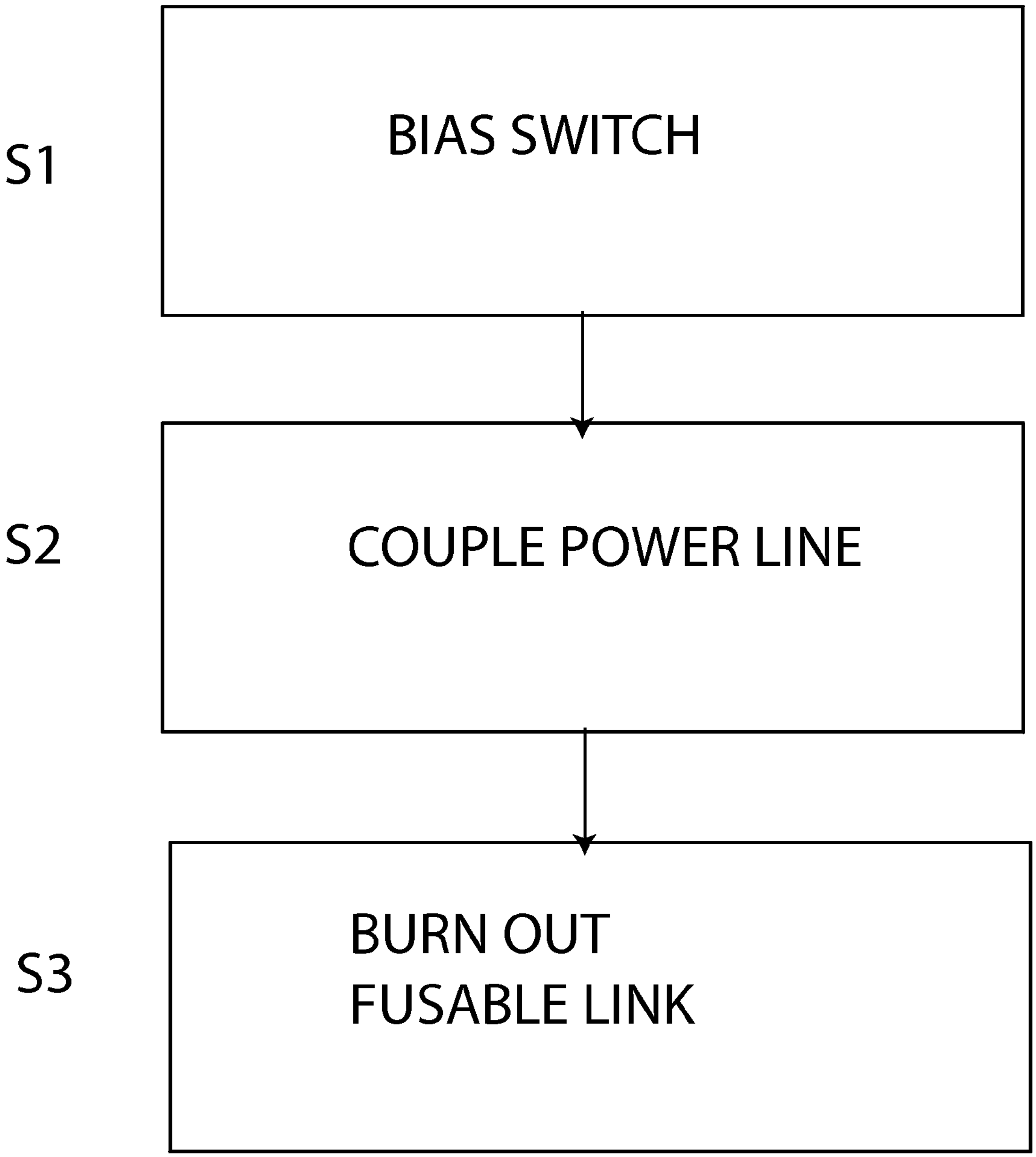
FIG. 11 is a flow chart for the process for bi-directional switching.

FIG. 11 is a simplified flow chart for the process for selectively switching at least one switch to connect a GFCI to power regardless of which interface is wired to a power line. For example, in this process, the first step S1 includes biasing at least one switch in at least a first position. An example of this biasing is shown in FIG. 1. Next, in step S2, the process proceeds with the coupling of a power line to at least one of a first interface 20 or a second interface 100 as shown by way of example in FIGS. 2 and 5. Next, in step S3, the process proceeds to the burning out at least one fusable link such as fusable links 28 and 90, coupled to at least one of the first interface 20 and said second interface 100 to release the switch or switch body 32. This step is shown by way of example in FIGS, 3, 4, 6-10. As explained above, the switch is adapted to selectively move, to selectively couple power from a power line to a fault circuit interrupter 50.

Accordingly, while only a few embodiments of the present invention have been shown and described, it is obvious that many changes and modifications may be made thereunto without departing from the spirit and scope of the invention.

What is claimed is:

1. A bi-directional fault circuit interrupter comprising:

a) a first connection interface;

b) a second connection interface;

c) at least one fault circuit;

d) at least one switch which is movable from at least one first position to at least one second position to selectively electrically connect said at least one fault circuit to either said first connection interface or to said second connection interface; and e) a plurality of conductors configured to electrically connect said first connection interface to said at least one switch and said second connection interface to said at least one switch;

f) at least one spring for biasing said at least one switch in a first position; and g) at least one anchor coupled to said at least one switch which is disposed opposite said at least one spring.

2. The bi-directional fault circuit interrupter as in claim 1, wherein said first connection interface comprises at least one phase line and at least one neutral line.

3. The bi-directional fault circuit interrupter as in claim 1, wherein said second connection interface comprises at least one phase line and at least one neutral line.

4. The bi-directional fault circuit interrupter as in claim 1 , wherein said at least one fault circuit comprises at least one transformer.

5. The bi-directional fault circuit interrupter as in claim 1 , wherein said at least one fault circuit comprises at least one integrated circuit.

6. The bi-directional fault circuit interrupter as in claim 4, wherein said at least one transformer comprises at least one differential transformer, and at least one grounded neutral transformer.

7. A bi-directional fault circuit interrupter comprising:

a) a first connection interface;

b) a second connection interface;

c) at least one fault circuit;

d) at least one switch which is movable from at least one first position to at least one second position to selectively electrically connect said at least one fault circuit to either said first connection interface or to said second connection interface;

e) a plurality of conductors configured to electrically connect said first connection interface to said at least one switch and said second connection interface to said at least one switch;

f) at least one anchor coupled to said at least one switch; and g) at least one spring coupled to said at least one switch disposed opposite said at least one anchor.

8. A bi-directional fault circuit interrupter comprising:

a) a first connection interface;

b) a second connection interface;

c) at least one fault circuit;

d) at least one switch which is movable from at least one first position to at least one second position to selectively electrically connect said at least one fault circuit to either said first connection interface or to said second connection interface; and e) a plurality of conductors configured to electrically connect said first connection interface to said at least one switch and said second connection interface to said at least one switch;

at least one spring for biasing said at least one switch in a first position; and a fusable link coupled to said at least one spring.

9. The bi-directional fault circuit interrupter as in claim 8, wherein said fusable link is one selected from the group consisting of a resistor, solder trace, and a wire.

10. The bi-directional fault circuit interrupter as in claim 8, wherein said fusable link is coupled between a first interface phase line and a first interface neutral line, and to said spring, wherein when a power line is coupled to said first interface, said fusable link is burned away to release said spring, thereby allowing said at least one switch to be thrown to said second position.

11. The bi-directional fault circuit interrupter as in claim 10, wherein said fusable link comprises a resistor which is configured to mechanically separate upon application of a line voltage.

12. The bi-directional fault circuit interrupter as in claim 7, further comprising at least one fusable link coupled to said at least one anchor.

13. The bi-directional fault circuit interrupter as in claim 10, wherein said fusable link is coupled between said second interface phase line and said second interface neutral line, and to said anchor, wherein when a power line is coupled to said second interface, said fusable link is burned away to release said anchor, thereby allowing said at least one switch to be thrown to said second position.

14. A method for selectively switching a bi-directional fault circuit interrupter comprising the steps of:

a) biasing at least one switch in at least one of a first position and a second position;

b) coupling a power line to at least one of a first interface or a second interface; and c) burning out at least one fusable link coupled to at least one of said first interface and said second interface to release said switch, wherein said switch is adapted to move to selectively couple power from said power line to a fault circuit interrupter.

15. The method as in claim 14, further comprising the step of releasing a spring coupled to said at least one switch to release a bias on said switch.

16. The method as in claim 14, further comprising the step of releasing an anchor coupled to said at least one switch to release said anchor holding said switch in a first position.

17. The method as in claim 14, wherein said step of coupling a power line to at least one of a first interface or a second interface comprises coupling a power line to said first interface, and wherein said step of burning out at least one fusable link coupled to at least one of said first interface and said second interface comprises burning out at least one fusable link coupled to said first interface, wherein the method further comprises the step of:

releasing at least one spring coupled to said fusable link, when said fusable link is burned out, said at least one spring being coupled to said at least one switch.

18. The method as in claim 17, further comprising the steps of:

burning out at least one fusable link coupled to said second interface, to release at least one anchor coupled to said fusable link coupled to said second interface; and releasing said at least one switch from said at least one anchor.

19. The method as in claim 14, wherein said step of coupling a power line to at least one of a first interface or a second interface comprises coupling a power line to said second interface, and wherein said step of burning out at least one fusable link coupled to at least one of said first interface and said second interface comprises burning out at least one fusable link coupled to said second interface, wherein the method further comprises the step of:

releasing at least one anchor coupled to said fusable link, when said fusable link is burned out, said at least one anchor being coupled to said at least one switch; and moving said at least one switch from said first position to a second position after said at least one fusable link is burned out.

20. The method as in claim 19, further comprising the steps of:

burning out at least one fusable link coupled to said first interface, to release at least one spring coupled to said fusable link coupled to said first interface; and releasing said at least one switch from said at least one anchor.

* * * * *